United States Patent [19]

Detanne et al.

[11] Patent Number: 5,318,270
[45] Date of Patent: Jun. 7, 1994

[54] VALVE WITH A CRENELLATED SEAT

[75] Inventors: Francois Detanne, Paris; Michel Vincent de Paul, Avilly St-Leonard, both of France

[73] Assignee: GEC Alsthom SA, Paris, France

[21] Appl. No.: 977,890

[22] Filed: Nov. 18, 1992

[30] Foreign Application Priority Data

Nov. 19, 1991 [FR] France .................... 91 14237

[51] Int. Cl.⁵ .................................... F16K 47/02
[52] U.S. Cl. .................................... 251/120; 251/333; 137/625.33
[58] Field of Search .................... 137/625.3, 625.33; 251/333, 118, 120

[56] References Cited

U.S. PATENT DOCUMENTS

| | | |
|---|---|---|
| 3,857,542 | 12/1974 | Heymann . |
| 4,705,071 | 11/1987 | Conners, Jr. et al. ........ 137/625.3 |
| 4,892,118 | 1/1990 | Davis et al. . |
| 5,150,736 | 9/1992 | Vincent de Paul et al. . |

FOREIGN PATENT DOCUMENTS

| | | |
|---|---|---|
| 0023172 | 1/1981 | European Pat. Off. . |
| 0156672 | 10/1985 | European Pat. Off. . |
| 0200509 | 11/1986 | European Pat. Off. . |
| 2187083 | 1/1974 | France . |
| 1007437 | 10/1965 | United Kingdom . |

*Primary Examiner*—Arnold Rosenthal
*Attorney, Agent, or Firm*—Sughrue, Mion, Zinn, Macpeak & Seas

[57] ABSTRACT

The present invention relates to a valve including a valve member co-operating with a seat provided with a crenellated portion disposed around the portion of the seat on which the valve member rests, said crenellated portion being constituted by teeth separated by gaps, the inside walls of the teeth being portions of a vertical axis cylinder, the width l of the gaps being less than the width b of the inside walls of the teeth, wherein the end wall of the valve member facing the crenellated portion when the valve member is in its closed position is convex in shape, co-operating with the inside wall of each tooth to form a channel that flares from top to bottom of the tooth, the point of contact C between the valve member and the seat being at a distance d from the base B of the crenellated portion lying in the range 0.25 times to 0.5 times the width l of the gap. Vibrations are eliminated at partial load and pressure fluctuations downstream from the valve are reduced.

1 Claim, 3 Drawing Sheets ns
VALVE WITH A CRENELLATED SEAT

The invention relates to valves, and more particularly to valves for controlling steam turbines.

BACKGROUND OF THE INVENTION

Such valves are used for adjusting the steam flow rate admitted to the turbine. At small or intermediate lifts, the energy dissipated in such valves is very considerable. At small lifts where supersonic speeds are reached in the vicinity of the zone where the valve member comes into contact with its seat, shock waves and separations between the fluid and the walls of the valve arise and can cause the valve member to vibrate. At all lifts, the focusing of the flow sheet onto the axis of symmetry of the valve (see FIG. 1) gives rise to large pressure fluctuations that may be as great as 50% of the mean pressure, with these fluctuations propagating downstream where, under certain circumstances, they can give rise to damage in the pipework.

One solution for solving such problems consists in splitting up the flow sheet into a plurality of small jets. This can be achieved using a seat that includes a throttling collar with crenellations distributed around its periphery in the form of gaps separated from one another by teeth, as described, for example, in French utility certificate No. 76 12647, or in German laid-open application DOS-3 138 459.

Throughout the world, most large steam turbines are fitted with such valves, but it turns out that a certain level of vibration persists at partial load.

SUMMARY OF THE INVENTION

The present invention provides a valve producing moderate pressure fluctuations, without vibration at partial loads, wherein the end wall of the valve member facing the crenellated portion when the valve member is in its closed position is convex in shape, co-operating with the inside wall of each tooth to form a channel that flares from top to bottom of the tooth, the point of contact C between the valve member and the seat being at a distance d from the base B of the crenellated portion lying in the range 0.25 times to 0.5 times the width l of the gap.

BRIEF DESCRIPTION OF THE DRAWINGS

An embodiment of the invention is described by way of example with reference to the accompanying drawings, in which.

DETAILED DESCRIPTION

Figure 1:
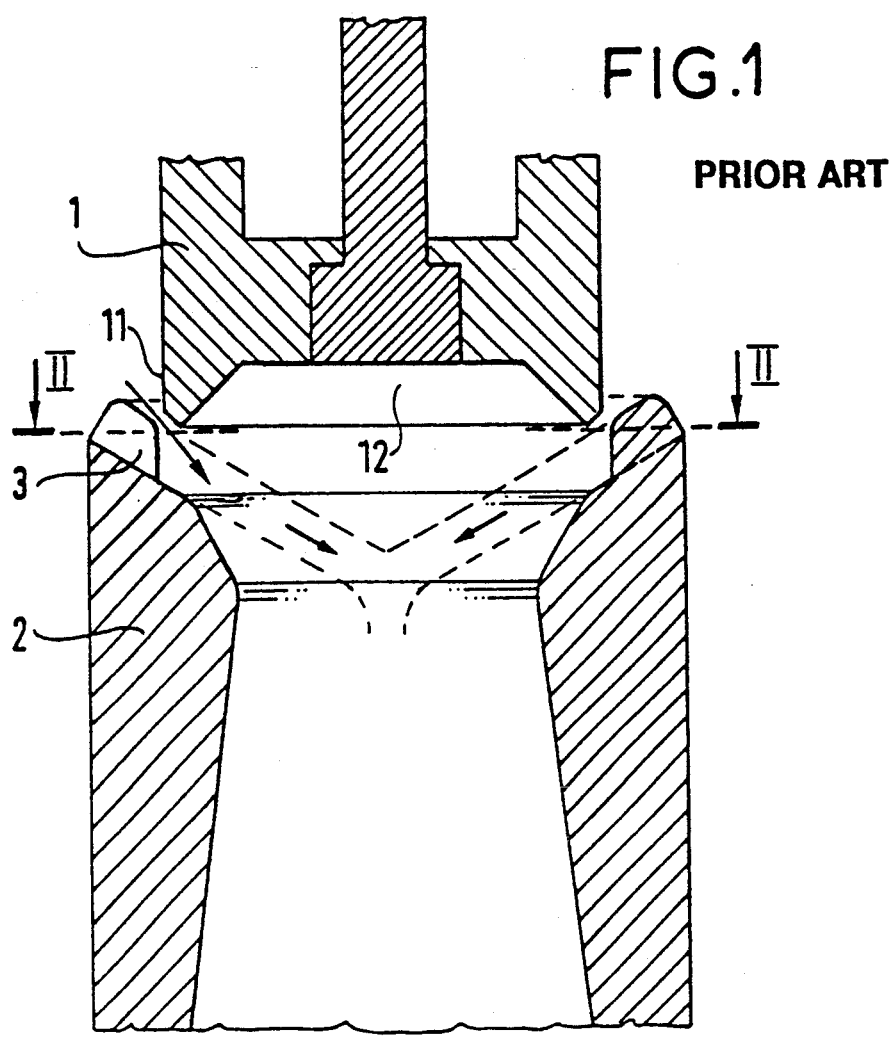
FIG. 1 shows a known valve.
Figure 2:
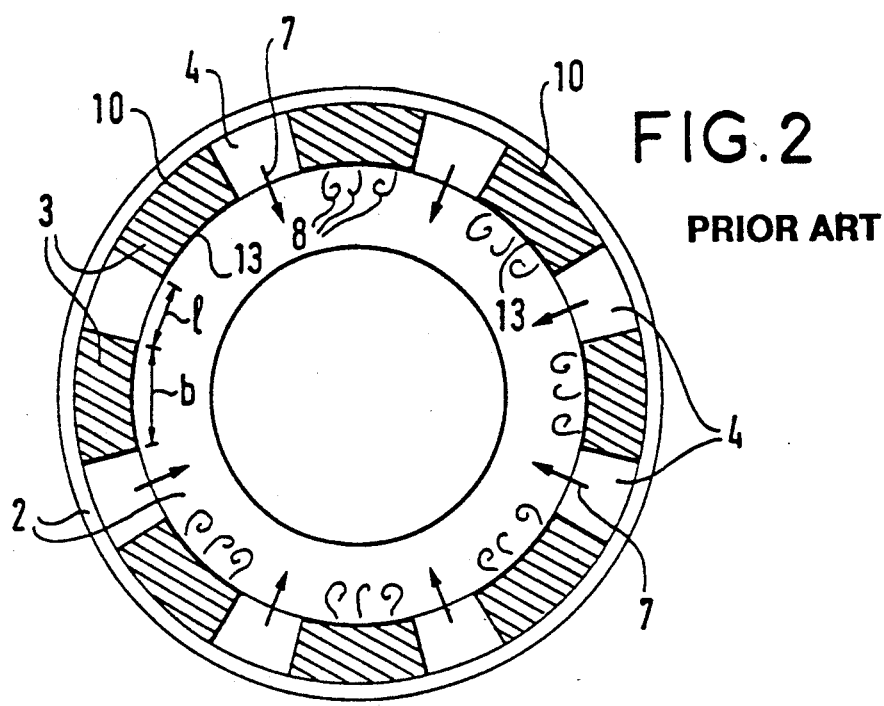
FIG. 2 is a horizontal section through the valve of FIG. 1.

FIGS. 1 and 2 show a known valve which comprises a valve member 1 that comes to rest on a seat 2. The valve member is circularly symmetrical about a vertical axis and is terminated by a surface 11 that surrounds a hollow recess 12. A crenellated portion 10 made of teeth 3 separated by gaps 4 is disposed on the seat 2. These teeth 3 are circularly disposed and have an inside wall 13 constituting a portion of a vertical axis cylinder (same axis as the valve member) and they surround the valve member 1 when it rests on the seat 2. The width l, of the gaps between the teeth is less than the width b of the inside walls 13 of the teeth 3.

When the valve member 1 is inside the crenellated portion 10 (FIGS. 2 and 3) a certain quantity of fluid 2 passes via the channel 5 that exists between the valve member 1 and the teeth on the seat 2. The main flow 7 passes via the gaps 4. The width of the channel 5 is very narrow, it merely provides sufficient clearance to avoid friction between the valve member and the teeth 3.

Downstream from the teeth, there exists a slack zone which fluctuates because of the non-symmetrical departure of eddies 8 from the two sides of each tooth 3. This gives rise to pressure fluctuations that back up along the channel 5 and give rise to unsteady forces on the valve member 1, which forces increase with decreasing width of the channel 5, thereby giving rise to vibrations. The throat 9, i.e. the minimum section portion between the valve member 1 and the seat 2 is very close to the outlet sections from the gaps 4.

Figure 3:
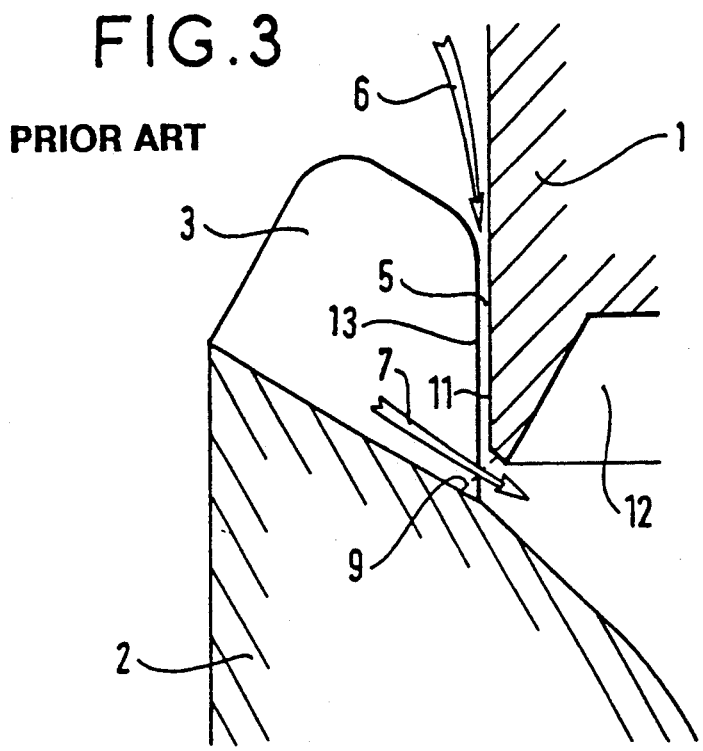
FIG. 3 shows the flow in the vicinity of the outlet from a crenellation in the seat of the FIG. 1 valve.
Figure 4:
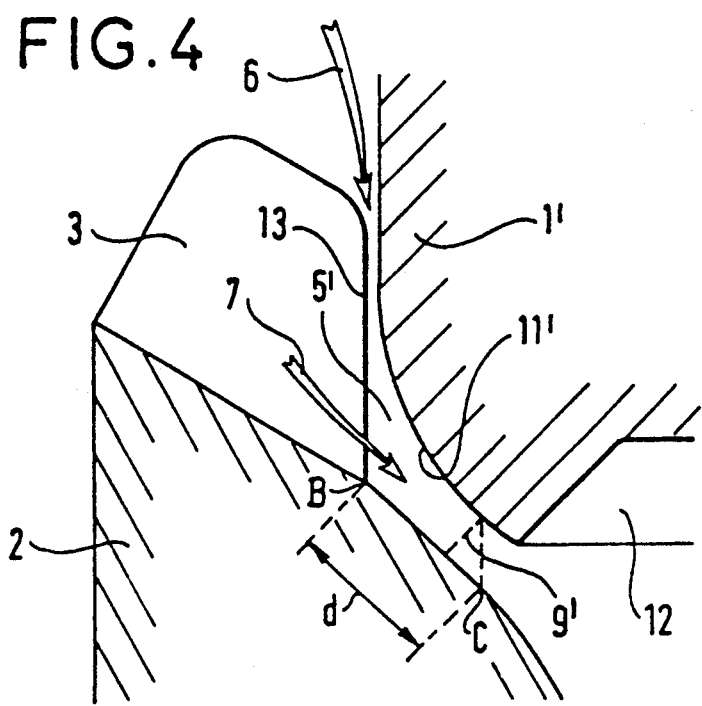
FIG. 4 shows the shape of the association between a crenellation and the valve member of the invention when the valve member is in a lifted position.
Figure 5:
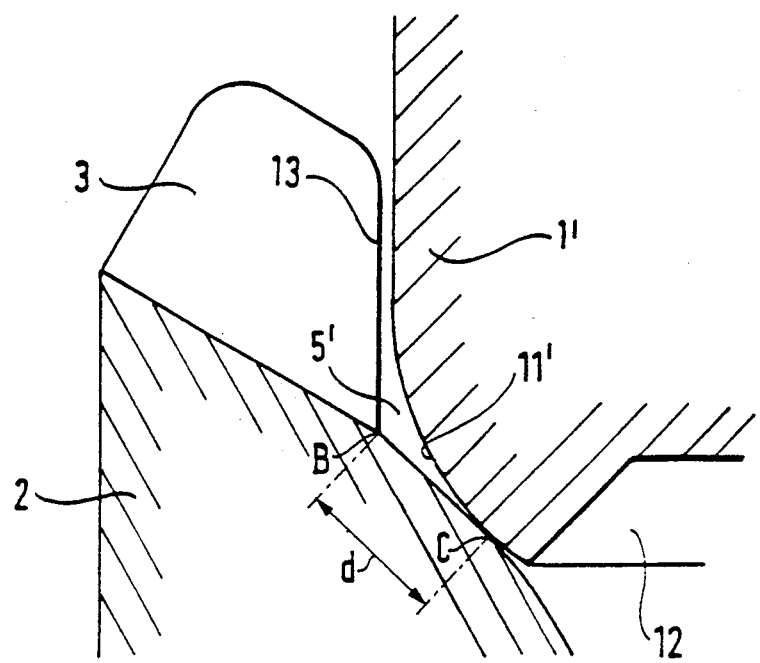
FIG. 5 shows the same crenellation and valve member association when the valve member is in its closed position.

FIGS. 4 and 5 show a single gap 4 and the end of a valve member 1' in accordance with the invention (compare with FIG. 3). Only the valve member 1' is changed. Like the valve member 1 it is circularly symmetrical about its axis. The end 11' of the valve member 11 that faces the inside walls 13 of the teeth 3 when the valve is in the closed position is convex in shape. It can be seen that the channel 5' between the valve member 1' and the teeth 3 in the crenellated portion 10 is very different in shape from the channel 5. Although the top portion continues to be narrow, the width of the channel flares in the bottom portion. It can be seen that in a half-open position of the valve (FIG. 4) a channel 5' of such a shape eliminates vibration due to pressure fluctuations generated by vortices escaping. Nevertheless, this shape has the drawback of distancing the throat 9' on the outlet section from the gap. If the throat 9' is distanced sufficiently, it can be seen that for small ratios k of the upstream pressure to the downstream pressure, for which the jets become supersonic from the throat, said jets regroup to form a continuous flow sheet. It is known that the lower the pressure ratio k and the greater the width of the section in which the flow becomes sonic, the more a supersonic jet flares.

Under such conditions, the effect of the crenellated seat 2 which is to provide jets that are separate is cancelled and the initial problems relating to such supersonic flow sheets reappear. To overcome these phenomena, it is necessary for the distance d between the base B of each gap 4 and the point of contact C between the valve member 1 and the seat 2 to lie in the range 0.25 to 0.5 times the width l of a gap, which width must be smaller than the width b of a tooth (3).

For d/l<0.25, the channel does not flare enough and there is a danger of certain vibrations subsisting as occurs in valves that have constant clearance between the valve member and the crenellated portion.

For d/l>0.5 or l/b>1, there is a danger of the flow sheet re-forming.

We claim:

1. A valve comprising a movable valve member engageable with a seat, a crenellated portion disposed around a portion of said seat upon which said valve member rests, said crenellated portion being constituted by teeth separated by circumferential gaps, said teeth having inside walls constituting portions of a vertical axis cylinder, said gaps having a width l which is less than a width b of the inside walls of the teeth, the improvement wherein said valve member includes an end wall facing the crenellated portion when the valve member in its closed position which is convex in shape, and defining with the inside wall of each tooth a channel that flares from top to bottom of the tooth, and wherein said valve member convex end wall has a point of contact C on said seat at a distance d from the base B of the crenellated portion which lies in the range of 0.25 times the 0.5 times the width l of said gaps between adjacent teeth.

* * * * *